United States Patent [19]

Sasaki

[11] Patent Number: 4,935,829

[45] Date of Patent: Jun. 19, 1990

[54] TAPE RECORDER WITH MODE CHANGING MOTOR MOUNTED ON CASSETTE HOLDER

[75] Inventor: Hidemi Sasaki, Tokyo, Japan

[73] Assignee: Fuji Photo Film Co., Ltd., Kanagawa, Japan

[21] Appl. No.: 292,849

[22] Filed: Jan. 3, 1989

[30] Foreign Application Priority Data

Jan. 11, 1988 [JP] Japan .................................. 63-3457

[51] Int. Cl.⁵ ............................................. G11B 15/00
[52] U.S. Cl. .................................... 360/93; 360/96.6; 360/137
[58] Field of Search .................... 360/85, 93, 95, 96.1, 360/96.5, 96.6, 137

[56] References Cited

U.S. PATENT DOCUMENTS 4,385,332 5/1983 Nakao ................................. 360/96.6

Primary Examiner—A. J. Heinz
Attorney, Agent, or Firm—Sughrue, Mion, Zinn, Macpeak & Seas

[57] ABSTRACT

A tape recorder is disclosed which employs a tape cassette having a cover for protection of a tape and includes a freely openable/closable cassette holder for storage of the tape cassette. In the tape recorder, in a space or a dead space existing on the upper surface of the tape cassette to be stored within the cassette holder and not interfering with the cover of the cassette holder, there is arranged at least a motor for switching the modes of the tape recorder such as a mode for tape loading and the like, so that the effective use of the dead space can be realized.

5 Claims, 9 Drawing Sheets

FIG. I

TAPE RECORDER WITH MODE CHANGING MOTOR MOUNTED ON CASSETTE HOLDER

BACKGROUND OF THE INVENTION

1. Field of the Invention

The present invention relates to a tape recorder and, in particular, to a tape recorder which uses a cassette having a cover for protection of tape.

2. Description of the Related Art

The tape recorder of the above-mentioned type includes a video tape recorder (VTR), a digital audio tape recorder (DAT) and the like. For example, an 8 mm VTR has a mechanism in which tape loading, braking of a reel carry member, forced contact of a pinch roller and the like are performed by a mode switching mechanism using a single small-size motor.

The above-mentioned mode switching mechanism in general uses a DC motor or a small-sized stepping motor which is combined with a reduction mechanism. That is, in the mode switching mechanism, the above-mentioned tape loading and other mode switching operations are carried out by rotating or moving a cam or the like.

However, from the viewpoint of reduction of the size of the recording equipment, the space that is taken up by the above-mentioned mode switching mechanism is too large and, if a smaller motor or the like is used for reduction of the size of the mechanism, then the operating speed thereof is inevitably slowed down to a great extent and the mode switching operation requires much more time, making the equipment hard to operate.

On the other hand, as shown in FIG. 9, in a tape cassette 1 which is employed in an 8 mm VTR or the like, there is provided rotatable cover 1B in the front surface of the cassette for tape protection. When it is opened, the cover 1B is moved greatly upward beyond the upper surface of a main body 1A of the cassette 1. For this reason, a cassette holder 2, which is used to stores therein the tape cassette 1 and also load the tape cassette 1 onto a shaft of rotation of a reel located on the side of a main body of a recording apparatus, is constructed such that is has a maximum height H1 greater than the maximum height H2 of the tape cassette 1 when the cover 1B is opened.

In the above-mentioned cassette holder 2, there is present a space (dead space) 3 which is not necessary for the cover 1B to be opened or closed on the upper surface of the tape cassette 1 to be stored in the holder 2. Only a keep spring 4 is located in the dead space. That is, the dead space 3 is not used effectively. Also, in VTR which is set forth in Japanese Utility Model Application Laid-open No. 61-187042, since the above-mentioned dead space is removed from the cassette holder, the holder has an appearance which has a projected or convexed shape but, however, in view of size, strength and the like, such shape is not desirable.

SUMMARY OF THE INVENTION

The present invention aims at eliminating the drawbacks found in the prior art tape recorders.

In order to achieve the above object, according to the invention, there is provided a tape recorder in which there is used a cassette including in the front surface thereof a rotatable cover, the cover being situated above a main body of the cassette when the cover is opened, there is disposed a cassette holder in a main body of the tape recorder for storing the cassette such that is is free to open or close, and, while the cassette holder is closed, reels in the cassette are loaded onto reel base members provided on the side of the tape recorder main body and the cover of the cassette is opened, the improvement comprising a space in the upper surface of the cassette to be stored within the cassette holder wherein there is provided at least a motor for switching of modes of the tape recorder in such said space within the cassette holder as not interfere with the cover of the cassette, and the drive force of the motor is transmitted through power transmission means to driven parts provided in the main body of the tape recorder.

According to the invention, part (at least a motor) of a mode switching mechanism for switching of modes for tape loading and other operations is arranged in the abovementioned dead space, so that the dead space can be used effectively.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a tape recorder according to the present invention with reference to the accompanying drawings.

Figure 8:
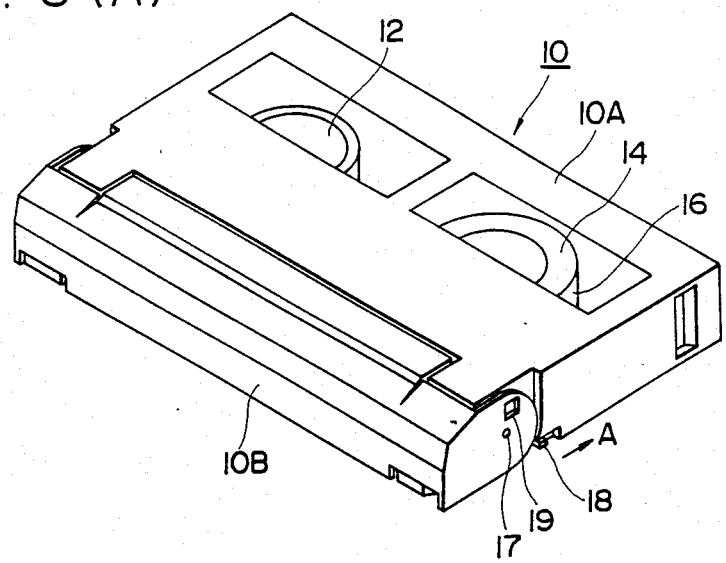
FIGS. 8(A) and (B) are respectively perspective views of an 8 mm cassette; the former showing a state in which a cover of the cassette is closed and the latter another state in which the cassette cover is opened; and, FIG. 9 is a section view of a cassette holder according to the prior art.
Figure 8:
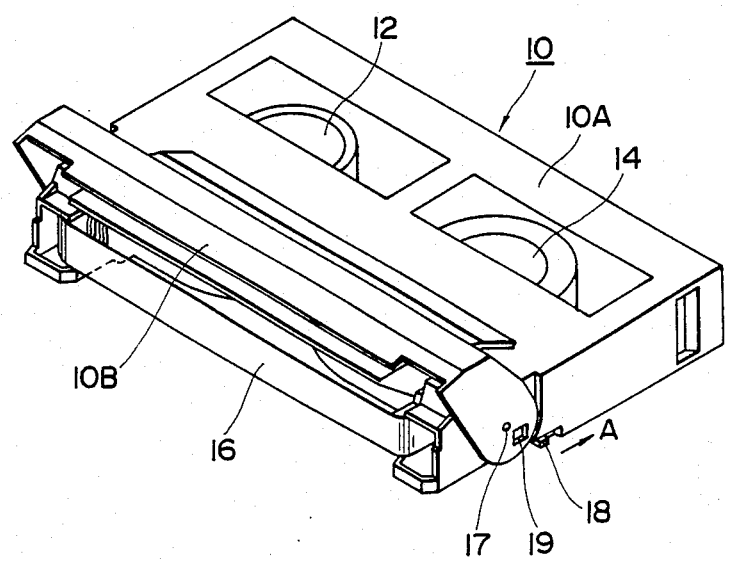
Figure 9:
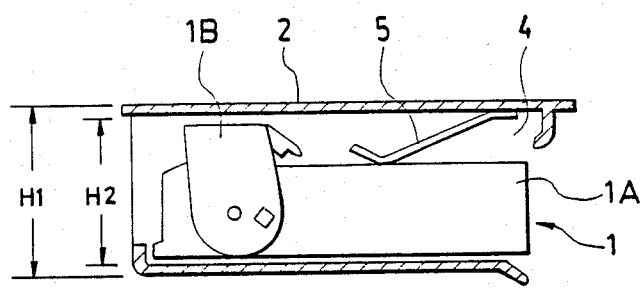

At first, a video cassette for use in an 8 mm VTR will be discussed. Referring now to FIGS. 8(A) and (B), there are illustrated perspective views of the 8 mm cassette, respectively showing the cover closed and opened states thereof.

As shown in these figures, a tape cassette 10 includes a cassette main body 10A in which reels 12 and 14 are stored in such a manner that they are free to rotate, and video tapes 16 and 16 are wound round the reels 12 and 14, respectively.

Also, in the cassette main body 10A, there is provided a cover 10B which is rotatable about a support shaft 17 to be opened or closed. The cover 10B is constructed such that, when it is closed, it prevents the tape present in the front surface of the cassette from being exposed. Further, on the side portion of the cassette main body 10A, there is arranged a lever 18 and, when the lever 18 is moved in the direction of an arrow A in FIGS. 8(A) and (B), then the cover 10B can be opened. The above-mentioned cover 10B is energized by a spring in a direction where it is closed and, in the side surface of the cover 10B, there is formed a window 19 which is positioned to be able to coincide with a hole (not shown) formed in the cassette main body 10A when the cover 10B is opened and also which is used to detect the end of the tape.

Figure 1:
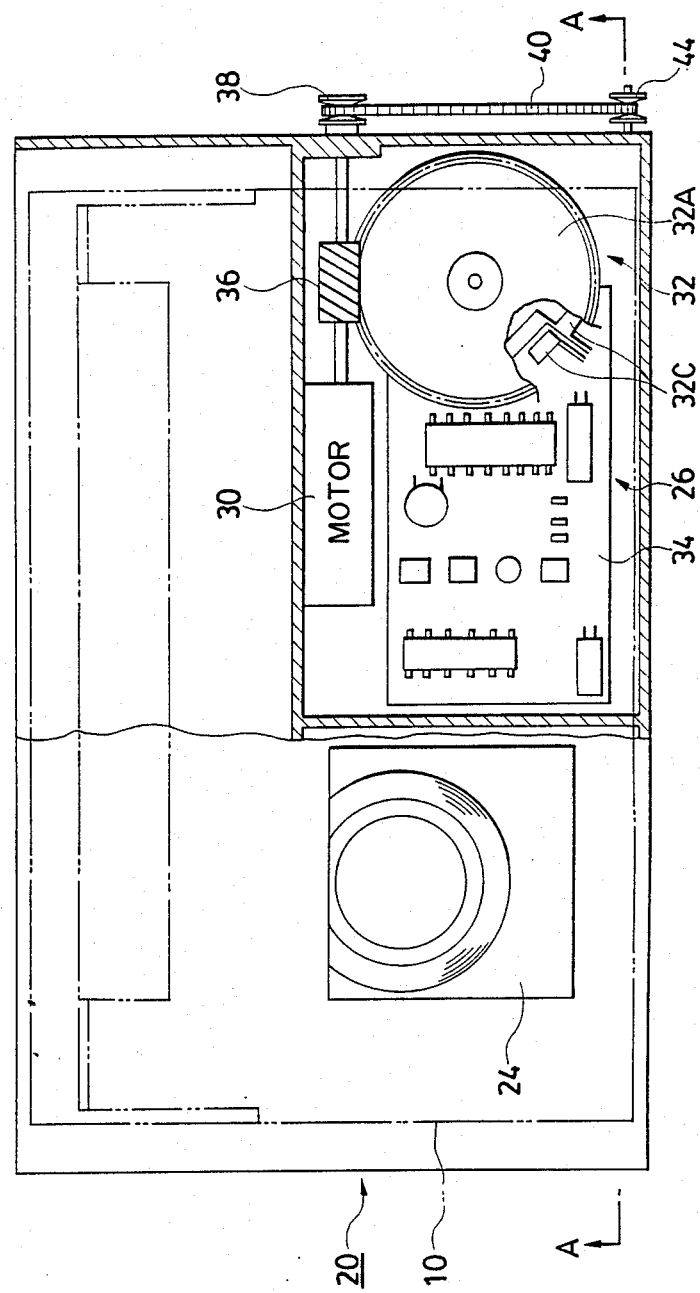
FIG. 1 is a plan view of a cassette holder for use in a tape recorder according to the invention, in including a section view of main portions of the cassette holder.
Figure 2:
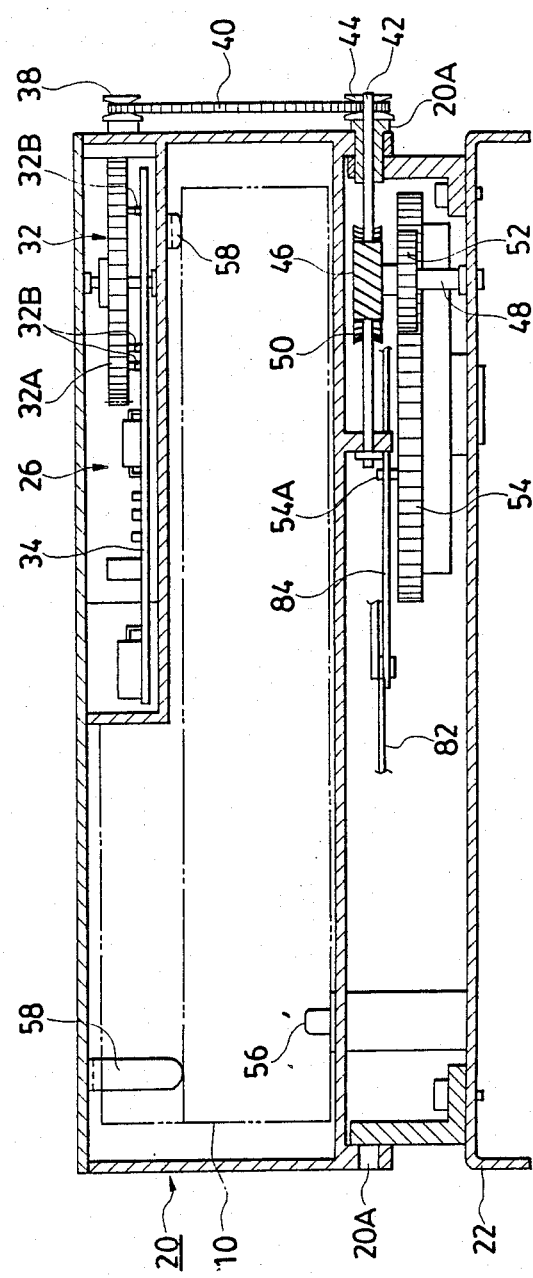
FIG. 2 is a section view of the above cassette holder taken along the line A—A in FIG. 1.

Referring now to FIG. 1, there is shown a plan view of a cassette holder, with the main portions thereof in section, in which the above-mentioned cassette is to be stored. In FIG. 2, there is shown a section view of the cassette holder taken along the line A—A in FIG. 1.

In these figures, the cassette holder designated by 20 is arranged in a main body 22 of the tape recorder in such a manner that it is free to rotate about a hinged supporting point 20A. Also, in FIG. 1, on the left upper surface of the cassette holder 20, there is formed a window 24 for reading the amount of residual tape and on the right of the window there is provided a motor storage section 26.

Figure 3:
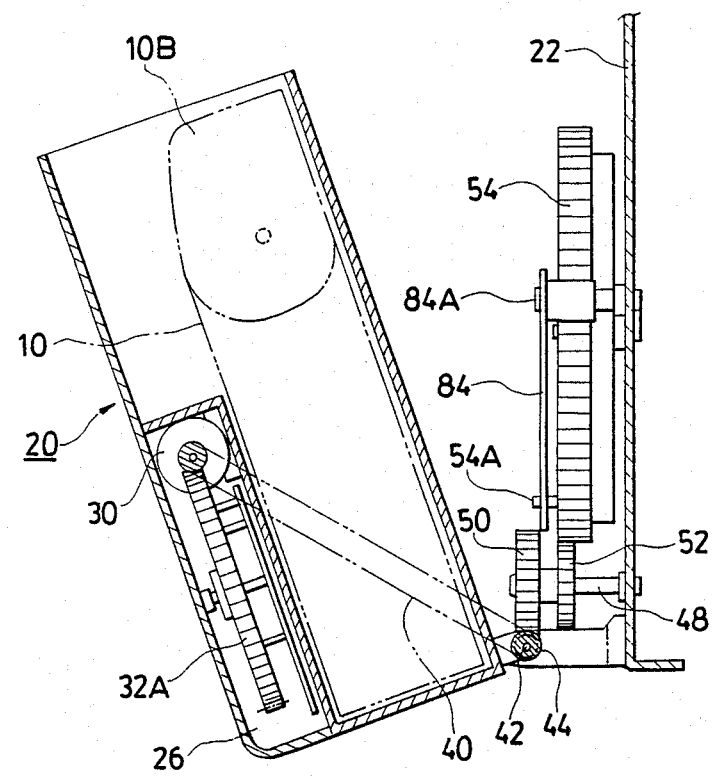
FIGS. 3 and 4 are respectively side views partly in section of the cassette holder; the former showing the opened state of the cassette holder and the latter the closed state thereof.
Figure 4:
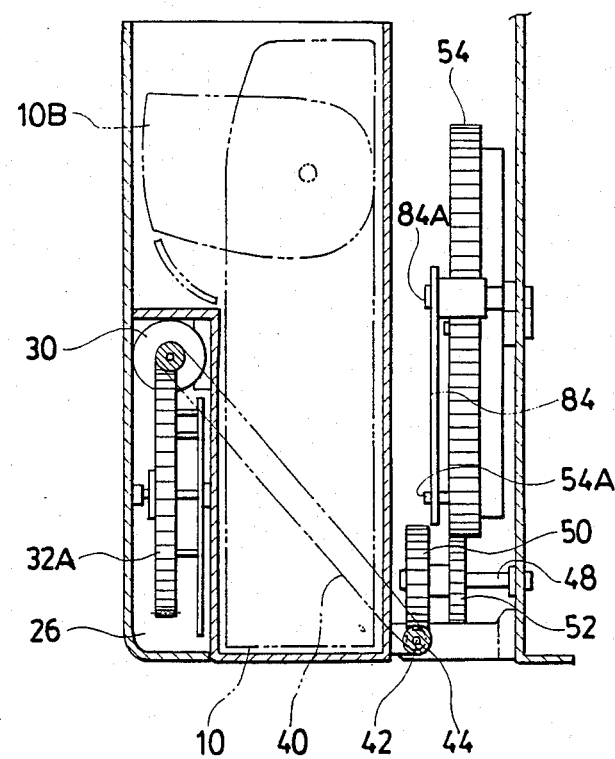

The above-mentioned motor storage section 26, as shown in FIG. 2, is a space present on the upper surface of the tape cassette 10 to be stored within the cassette holder 20 and also the motor storage section 26 is arranged such that it projects out into a space which does not interfere with the cover 10B of the cassette 10 when the cover 10B is opened or closed (see FIGS. 3 and 4).

In the motor storage section 26, there are arranged a motor 30 for switching modes, a mode detection switch 32, a circuit substrate 34 with a drive circuit for the motor 30 on board. The motor 30 has a drive shaft on which there are arranged a worm 36 and a pulley 38. The worm 36 is adapted to mesh with a worm wheel 32A and a timing belt 40 is wound round the pulley 40.

The worm wheel 32A has brushed 32B on the lower surface thereof and the brushes 32 cooperate with an electrode pattern 32C, which is disposed on the substrate opposed to the worm wheel 32A and on which the brushes 32B slide, to form the above-mentioned mode detect switch. In other words, if the motor 30 is rotated to rotate the worm wheel 32A by means of the worm 36, then there is taken out a signal which corresponds to the position of rotation of the worm wheel 32A so that mode detection to be described later can be performed.

On the other hand, the timing belt 40 is extended between and round the above-mentioned pulley 38 and a pulley 44 which is arranged on a shaft of rotation passing through the center of the above-mentioned hinged supporting point 20A and, therefore, the drive force of the motor 30 can be transmitted through the pulley 38, timing belt 40 and pulley 44 to the shaft of rotation 42 which is located on the side of the main body 22.

The shaft of rotation 42 is provided with a worm 46 which meshes with a worm wheel 50 arranged on a shaft 48 which is planted on the main body 22. Also, there is provided a gear 52 which is disposed coaxially with the worm wheel 50 and can be rotated by means of rotation of the shaft 48. The gear 52 also intermeshes with a main cam 54 which is planted on the main body 22.

Therefore, if the motor 30 is rotated, then rotational power thereof is transmitted through the pulley 38, timing belt 40, pulley 44, shaft of rotation 42, worm 46, worm wheel 50, shaft 48 and gear 52 to the main cam 54 to thereby rotate the main cam 54.

In FIG. 2, numeral 56 designates a pin which is planted on the main body 22 to position the cassette 10, and 58, 58 respectively stand for springs used to keep the cassette 10. Also, the cassette holder 20 is electrically connected to the main body 22 by means of a flexible wiring or the like.

Referring now to FIGS. 3 and 4, there are shown side views, partly in section, of the cassette holder; the former illustrating the opened state thereof and the latter the closed state thereof. As shown in FIG. 3, the cassette holder 20 is normally energized in the opened direction thereof by a spring (not shown) and, in the opened state of the cassette holder 20, the cassette 10 can be inserted into and ejected from the cassette holder 20. Also, the cassette holder 20 is constructed such that the cassette 10 can be inserted into the cassette holder 20 from the back side thereof (that is, the opposite side to the above-mentioned cover 10B).

If the cassette holder 20 is closed after the cassette 10 is inserted into the cassette holder 20, then the cassette 10 is positioned by the positioning pin 56 (FIG. 2) planted on the main body 22 and at the same time reel base members (not shown) are engaged with the reels 12, 14 of the cassette 10, respectively. Also, the front cover 10B of the cassette 10 is opened in connection with the closing operation of the cassette holder 20 and loading guide members 64, 66 and the like (see FIG. 5), which are used to load the tape, are inserted into a cassette mouth section 10C of the cassette 10, respectively.

Due to the fact that the shaft of rotation 42 of the pulley 44 is disposed at the center of the hinged supporting point 20A of the cassette holder 20, the power transmission path from the motor 30 to the main cam 54 is always maintained in a connected state, whether the cassette holder 20 is opened or closed.

Figure 5:
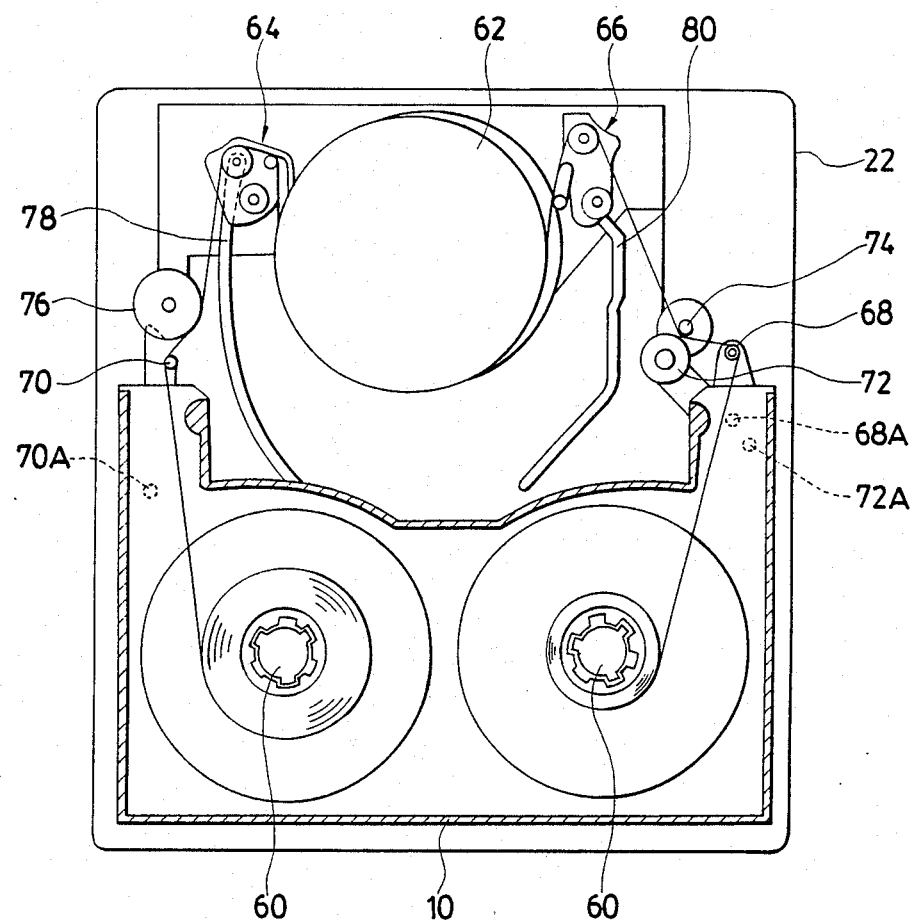
FIG. 5 is a plan view of a main body of tape recorder according to the invention.

Referring now to FIG. 5, there is shown a plan view of the main body of the tape recorder according to the invention, illustrating a state in which the loading of the tape has been completed. In this figure, in the main body 22 of the tape recorder, there are arranged reel base members 60, 60, a rotary head drum 62, loading guide members 64, 66 a tape guide member 68, a tension regulator pin 70, a pinch roller 72, a capstan 74, an impedance roller 76 and the like.

The loading guide members 64, 66 are respectively constructed such that they are able to move along guide rails 78, 80, respectively. And, the tape guide member 68, tension regulator pin 70 and pinch roller 72 are constructed to be able to rotate about supporting points 68A, 70A and 72A, respectively.

Figure 6:
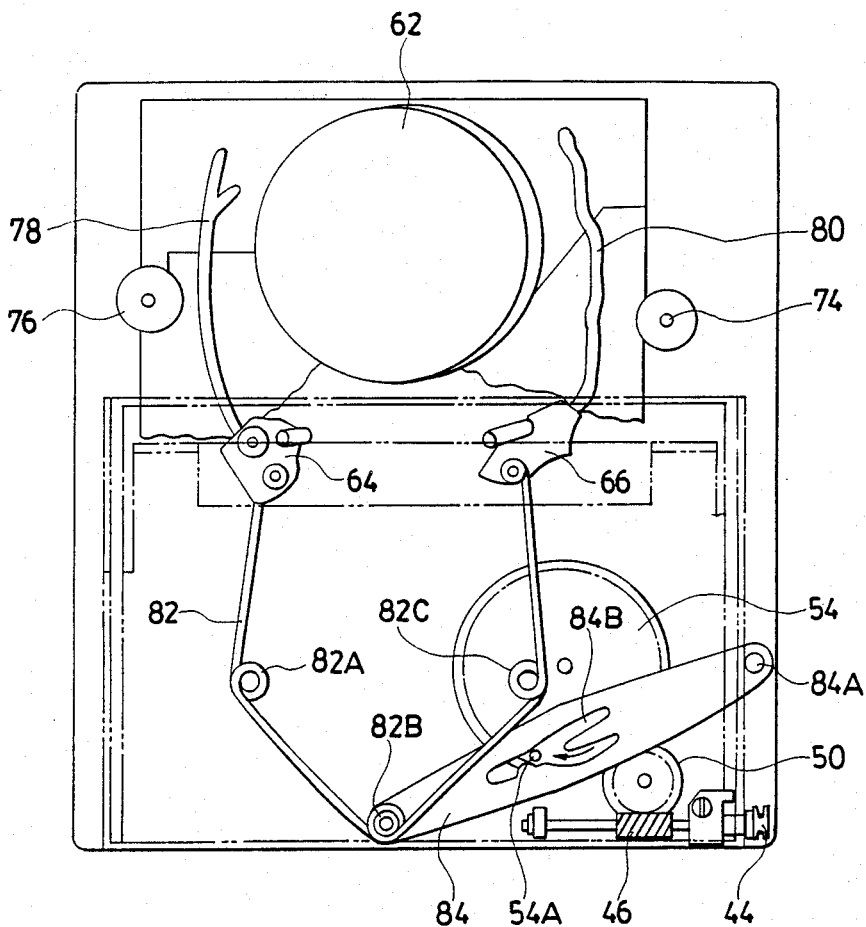
FIGS. 6 and 7 are plan views respectively to illustrate the respective operation states of a tape loading mechanism employed in the tape recorder shown in FIG. 5.
Figure 7:
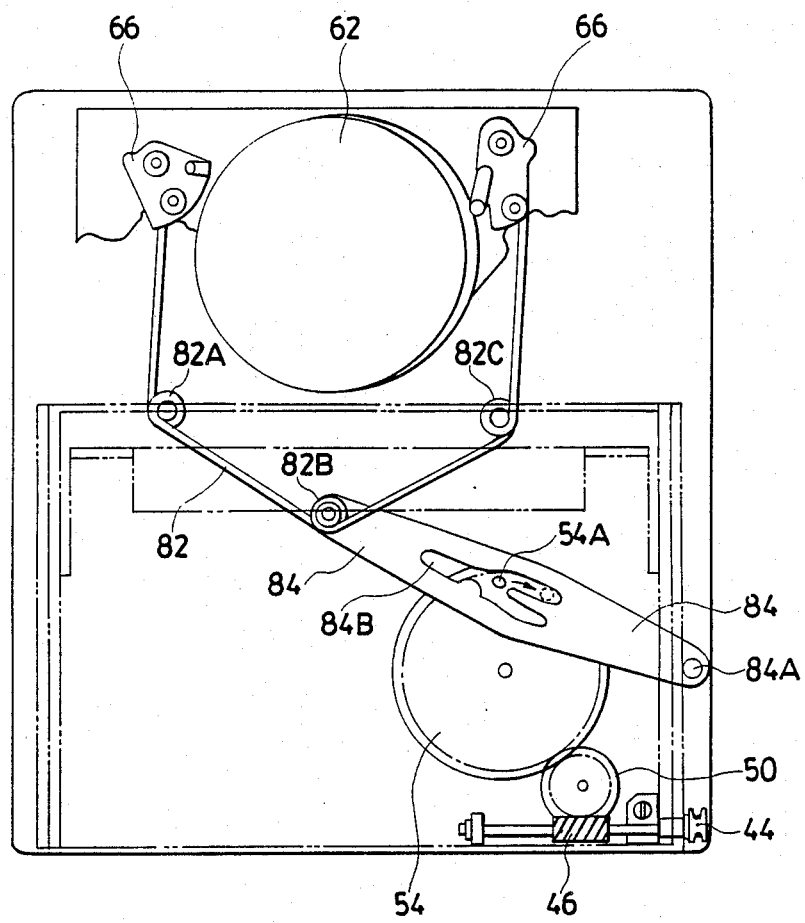

Now, FIGS. 6 and 7 are respectively plan views to show a mechanism on the side of the main body for moving the above-mentioned loading guide members and the like. As shown in these figures, the loading guide members 64 and 66 are connected to each other by means of a loading spring 82 which has three coil section 82A, 82B and 82C. The coil section 82B of the loading spring 82, which is disposed centrally of the spring 82, is pivotally connected to the leading end of a loading arm 84 which is arranged to be free to rotate about a supporting point 84A.

On the other hand, referring to the main cam 54, as shown in FIG. 2, the rotational power can be transmitted from the motor 30 located on the side of the cassette holder 20 to the main cam 54 through a power transmission mechanism, and the main cam 54 also has a cam pin 54A which is engaged with a cam groove 84B formed in the above-mentioned loading arm 84. For this reason, if the main cam 54 is rotated, then the loading arm 84 is oscillated to thereby cause the leading end of the loading arm 84 to substantially advance or retreat relative to the rotary head drum 22, with the result that the loading guide members 64, 66 are caused to move by means of the loading spring 82. Also, when the loading guide members 64, 66 move along the rails 78, 80, respectively, the respective positions of the loading guide members 64, 66 as well as their relative positional relations with respect to the position of the leading end of the loading arm 84 are varied, but such positional variations of the loading guide members 64, 66 can be coped with or absorbed by the flexible transformation of the loading spring 82 (especially the tree coil sections 82A, 82B and 82C thereof).

Now, if the main cam 54 is rotated to thereby move the cam pin 54A from a position shown by a broken line to another position shown by a full line in FIG. 6, then the loading arm 84 is not rotated during the movement of the cam pin 54A, but the tape guide member 68 and tension regulator pin 70 are rotated by a cam (not shown) on the back surface of the main cam 54, so that the tape within the cassette is swung out right and left.

Next, if the main cam 54 is rotated from its position shown in FIG. 6 to a position shown in FIG. 7, then, as discussed before, the loading guide members 64, 66 are moved along the guide rails 78, 80, respectively to draw out the tape within the cassette and wind it round the rotary head drum 62 (see FIG. 5).

Further, if the main cam 54 is rotated and thus the cam pin 54A is moved from a position shown by a full line to a broken line in FIG. 7, then the loading arm 84 is not rotated during such movement of the cam pin 54A, but the pinch roller 72 is rotated by a cam (not shown) on the back surface of the main can 54 and is then pressed against the capstan 74 (see FIG. 5). Also, the above-mentioned operation of the main cam 54 (namely, the operation of the loading mechanism) is detected by the mode detect switch 32 (FIG. 1) provided within the cassette holder 20 and is controlled by a control circuit.

In the illustrated embodiment of the invention, description has been given of a case in which the power transmission path between the motor 30 and the main cam 54 and the like is always maintained in a connected condition, but, according to the invention, the power of the motor can be transmitted to the main body of the tape recorder only when the cassette holder 20 is closed. In this case, however, the mode detect switch must be arranged on the side of the main body of the tape recorder. Also, the type of the cassette holder is not always limited to the hinged type that is employed in the illustrated embodiment, but a pantagraph type of cassette and the like cam also be used. Further, the reduction mechanism of the motor may also be arranged on the side of the cassette holder.

In addition, the outputs for driving the main can, pushing the pinch roller and the like may be drawn out from both sides of the cassette holder. In brief, any structure may be employed, provided that part (at least of a motor for mode switching) of the tape loading mechanism is located in the dead space of the cassette holder.

As has been described hereinbefore, in the tape recorder according to the invention, due to the fact that part of the tape loading mechanism including at least a motor for mode switching is arranged in a dead space provided in the upper surface of a cassette within a cassette holder, the effective use of the dead space is realized, permitting the reduction of the size of the tape recorder.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. In a tape recorder wherein there is used a cassette including in the front surface thereof a rotatable cover, said cover being situated above a main body of said cassette when said cover is opened, a cassette holder for storing said cassette is disposed in a main body of said tape recorder in such a manner that said cassette holder can be freely opened or closed, and, while said cassette holder is closed, reels in said cassette are loaded onto reel base members provided on the main body side of said tape recorder and said cassette cover is opened, the improvement comprising a space existing on the upper surface of said cassette to be stored within said cassette holder and not interfering with said cover of said cassette wherein at least a motor for switching the modes of said tape recorder is located in said space within said cassette holder, and the drive force of said motor is transmitted through power transmission means to driven parts provided in said tape recorder main body.

2. A tape recorder as set forth in claim 1, wherein said cassette holder is arranged in said tape recorder main body such that it is free to rotate about a hinged supporting point, and said power transmission means includes a shaft of rotation passing through said hinged supporting point and transmits the drive force of said motor to said driven parts within said tape recorder main body through said shaft of rotation.

3. A tape recorder as set forth in claim 2, wherein there is arranged in said space within said cassette holder a mode detection switch for outputting a signal corresponding to the position of rotation of said motor.

4. A tape recorder as set forth in claim 1, wherein said cassette holder is connected through a pantagraph mechanism to said tape recorder main body such that it is free to open or close, and said power transmission means can transmit the drive force of said motor to said driven parts within said tape recorder main body only when said cassette holder is closed.

5. A tape recorder as set forth in claim 3 or 4, wherein there is arranged in said space within said cassette holder a circuit substrate mounting thereon a circuit for driving said motor.

* * * * *